May 12, 1964  M. W. HILL  3,132,511
PROVING RING

Filed Sept. 6, 1961

INVENTOR.
MARVIN W. HILL
BY
ATTORNEYS

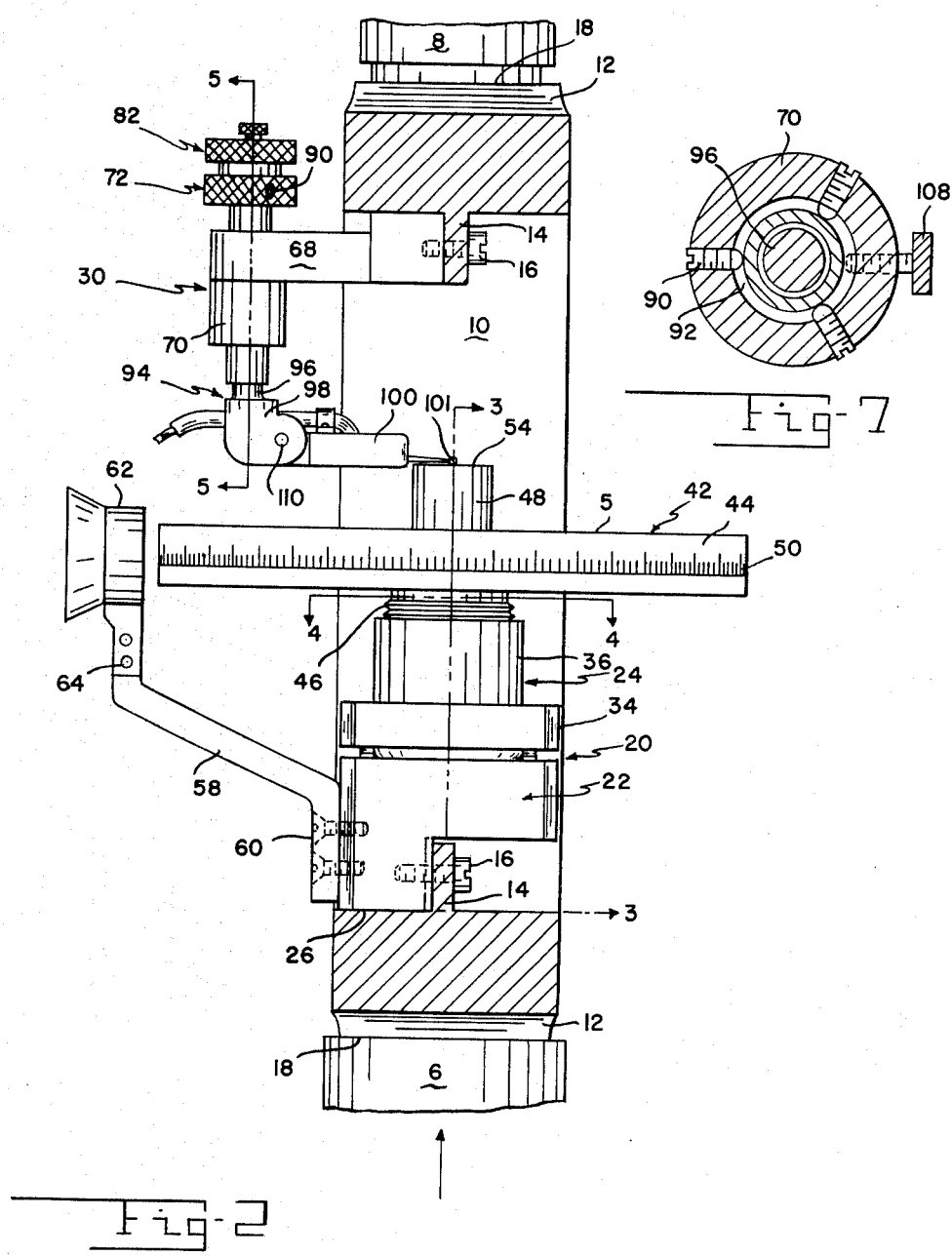

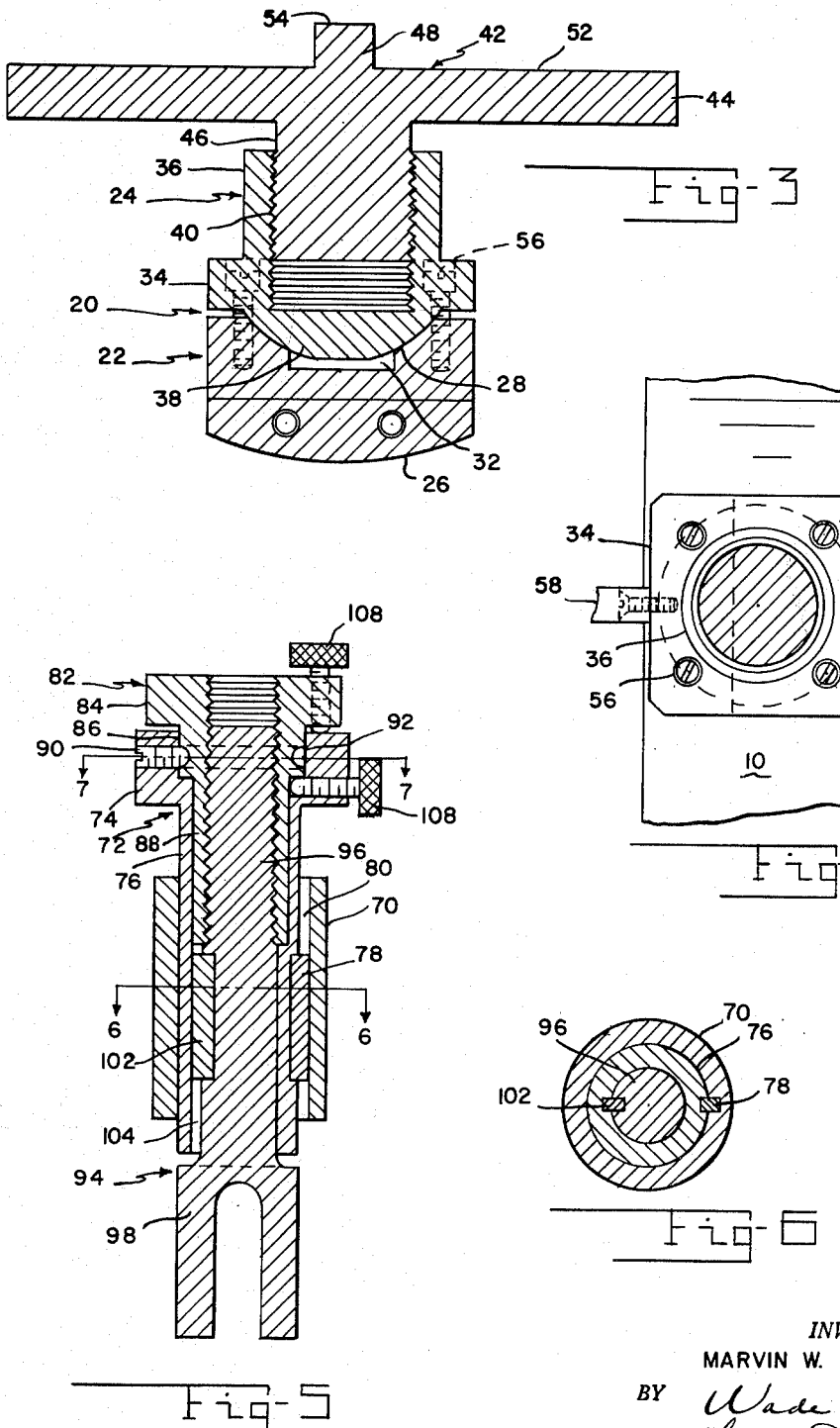
May 12, 1964
M. W. HILL
3,132,511
PROVING RING
Filed Sept. 6, 1961
3 Sheets-Sheet 3
INVENTOR.
MARVIN W. HILL

United States Patent Office 3,132,511
Patented May 12, 1964

3,132,511
PROVING RING
Marvin W. Hill, 1530 Menefee, San Antonio, Tex.
Filed Sept. 6, 1961, Ser. No. 136,374
3 Claims. (Cl. 73—141)
(Granted under Title 35, U.S. Code (1952), sec. 266)

The invention described herein may be manufactured and used by or for the Government for governmental purposes without the payment to me of any royalty thereon.

This invention relates to proving rings which are instruments used primarily for the calibration of compression and tensile machines, weighing machines, and for the calibration of load cells and the like.

A proving ring consists essenitally of a heavy ring of suitable material which is stress relieved, and of attached measuring means for measuring the deflection of the ring when loaded with compressive or tensile forces.

A properly built deformable ring when not loaded to produce a unit stress beyond the elastic limit of the material will follow the formula $F=KD$ where F is the force in pounds applied to the instrument, K is the instrument constant and D is the deflection or deformation as measured by the attached measuring means.

The instrument may be initially calibrated over its intended range of use by the National Bureau of Standards or other organization with a suitable dead-weight load machine. A calibration chart is prepared to show the deformation of the instrument at various applied loads. It has been found that the instrument constant K in a properly stress relieved ring will remain quite constant over an extended period of time so that a given deformation is a true indication of an applied force. Therefore, in use, when the instrument is used as a machine calibrating device, the deformation of the ring is read and by reference to the calibration chart the applied force in pounds is established.

The primary object of this invention is to produce a proving ring of rugged and simple design which is easy to "zero" and on which deformations may easily be read.

Another object of this invention is to produce an instrument which will utilize an electric height gauge as the means for establishing a "zero" position.

Still another object of this invention is to produce an instrument on which the "zero" may arbitrarily be established at any convenient height.

Additional objects, advantages and features of the invention reside in the construction, arrangement and combination of parts involved in the embodiment of the invention as will appear from the following description and accompanying drawings, wherein:

FIG. 2 is a side elevation of the instrument with the near side of the ring broken away to show the elements mounted within the ring;

FIG. 3 is a vertical section along line 3—3 of FIG. 2 and showing the construction of the ball-socket mount;

FIG. 4 is a transverse section along line 4—4 of FIG. 2 and showing the leveling screws;

FIG. 5 is a vertical section along line 5—5 of FIG. 2 showing construction of the coarse and fine vertical adjusting means;

FIG. 6 is a transverse section along line 6—6 of FIG. 5; and

FIG. 7 is a transverse section along line 7—7 of FIG. 5.

Figure 1:
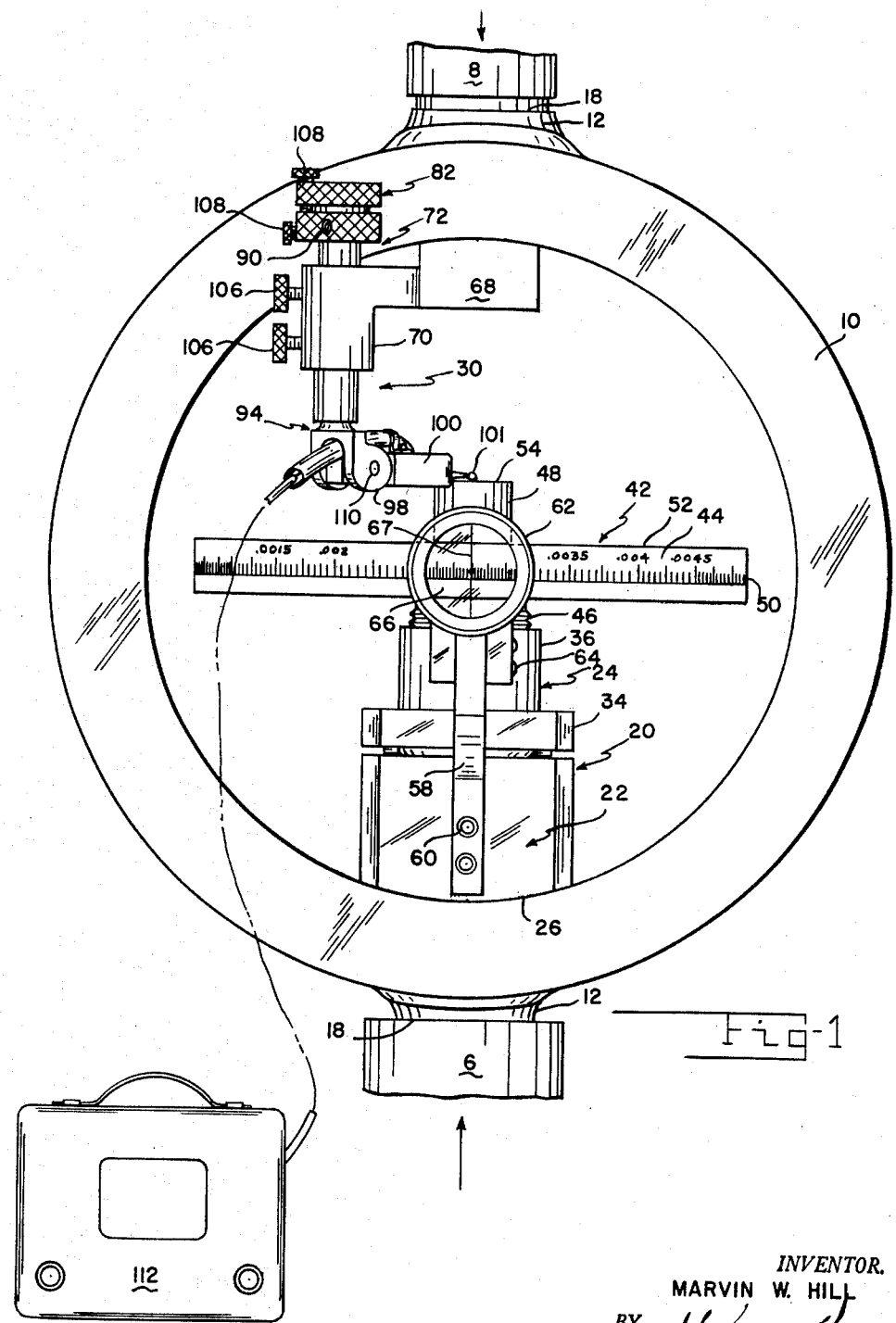
FIG. 1 is a front elevation of the instrument with compressive force being applied as by a compression testing machine.

Referring to FIG. 1 and FIG. 2, deformable ring 10, which may be of any suitable elastic material, is preferably made of steel, machined to a uniform cross section, polished and stress relieved. Integral with ring 10 and on a common diametrical or transverse axis are externally protruding load receiving bosses or pads 12 of a diameter slightly less than the axial thickness of the ring. The pads are blended into the ring to avoid corners with high stress concentration. On the same common axis with pads 12 and integral with the internal diameter of ring 10 are two mounting lugs 14 protruding inwardly as shown on FIG. 2. Mounting lugs 14 are normal to the axis of the ring and of any width which is convenient for mounting thereto the ball and socket mount assembly 20 and the electric height gauge assembly 30 by means of screws 16 as shown on FIG. 2. The pads 12 have their ends ground to form parallel bearing surfaces 18 which are normal to the common axis through the pads. Ring 10 as shown on FIG. 1 and FIG. 2 is between anvil 6 and ram 8 of a compression machine which is applying force in the direction of the arrows.

Ball and socket mount assembly 20 comprises socket half 22 and ball half 24. Socket half 22 has a curved surface 26 with radius slightly less than the inside radius of ring 10. Referring to FIG. 3 socket half 22 has a spherically ground socket 28 and a relief 32. Ball half 24 consists of a flange 34, a boss 36 and a partial spherical ball 38 which engages the spherical socket 28. Boss 36 has internal threads 40.

Micrometer thimble 42 comprises a graduated drum 44, a threaded shank 46 which engages internal threads 40 in boss 36 of ball half 24, and anvil 48. Micrometer thimble 42 is preferably made of steel and should be heat treated and ground. The graduated drum 44 should be made quite thick in order for the thimble to have enough mass to apply axial loading on threads 40. The graduated drum 44 has a machine cut graduated scale 50 which will be described hereafter.

In order to have small unit graduations on the graduated scale 50 the graduated drum 44 should be of large diameter and the threaded shank 46 should have a fine pitch thread.

The thread used on my invention was 80 threads per inch which gave an axial movement of .0125 inch per revolution. The circumference of drum 44 was divided into 1250 equal parts by equally spaced scribe lines. This resulted in a reading of .00001 inch between successive scribe lines.

The upper edge 52 of the graduated drum 44 and the upper edge 54 of anvil 48 should be ground parallel with each other and perpendicular to the threaded shank 46 in order to get true deformation readings when using the instrument.

Ball half 24 is held in engagement with socket half 22 by means of four leveling screws 56 as best shown on best shown on FIG. 3 and FIG. 4. The spherical ball 38 does not completely enter the spherical socket 28 and results in a clearance between the bottom of flange 34 on ball half 24 and the top of socket half 22. By loosening and tightening the various leveling screws 56, the upper edge 52 of the graduated drum 44 is leveled with bearing surface 18 on the bottom pad 12 in the same manner a transit is leveled.

Bracket 58 is attached at its lower end to socket half 22 by means of screws 60. Eye piece 62 is attached to the upper end of bracket 58 by means of pins 64. Within eye piece 62 is magnifying lens 66 with a scribed index line 67 for magnifying and reading the graduated scale 50.

Electric height gauge assembly 30 has a bracket 68 as shown on FIG. 1 and FIG. 2 which terminates in boss 70. Slideably mounted within boss 70 is coarse adjusting sleeve 72 which has a knurled head 74 and sleeve 76 which slides within boss 70. The coarse adjusting sleeve is prevented from having circumferential motion by means of key 78 partially embedded in sleeve 76 and riding in key slot 80 which is cut into the side of the bore in boss 70. Fine adjusting screw 82 has knurled head 84, a shoulder 86 which fits into a counterbore within the knurled head 74 of coarse adjusting screw 72 and a sleeve 88 which is journaled within a bore in the sleeve 76 of coarse adjusting screw 72. The fine adjusting screw 82 is axially restrained within the coarse adjusting sleeve 72 by means of three spherical end screws 90 which engage the spherical groove 92 in shoulder 86 of the fine adjusting screw 82 as best shown on FIG. 5 and FIG. 7.

Stem 94 has a threaded shank 96 which engages a mating female thread in sleeve 88 of fine adjusting screw 82 and a yoke 98 machined to hold electric height gauge 100. Stem 94 is prevented from having circumferential motion by means of key 102 partially embedded in shank 96 and riding in key slot 104 which is cut into the side of the bore through the coarse adjusting sleeve 72.

The coarse adjusting sleeve 72 is held in its desired position by means of lock screws 106 as shown on FIG. 1. Lock screws 106 are threaded through boss 70 and apply pressure on sleeve 76 of coarse adjusting sleeve 72. The fine adjusting screw is held in its set position by lock screws 108 as shown on FIG. 1 and FIG. 5.

The electric height gauge 100 with feeler pin 101 is commercially available as for example from the Mertz Engineering Company of Indianapolis, Indiana. The height gauge is attached to yoke 98 of stem 94 by means of pin 110. The output from electric height gauge 100 is read on meter 112.

While the embodiment of the invention disclosed by the specification and drawings indicate an electric height gauge because of its accuracy, other gauges such as a verenier height gauge or a dial indicator may be used.

In operation, the instrument is placed in the machine as shown on the drawings and the thimble is turned to some convenient position with the graduated scale set to the zero reading. The electric height gauge feeler pin is then brought to a point contact with the upper edge of the anvil, being adjusted by means of the coarse and fine adjustment until a zero reading is secured on the meter. The force from the machine is then applied to the instrument which will produce a slight deformation in the ring. While the force is being constantly applied, the thimble is rotated until the height gauge again produces a zero reading on the meter. The scale on the thimble is then read. This reading is the deflection of the ring under the applied load. Referring to the calibration chart for the particular instrument used, the actual applied load in pounds may be found for the given deflection of the ring.

While the embodiment of the invention disclosed by the specification and drawings is an instrument to receive compressive force, the invention may as easily be adapted to an instrument for receiving tensile force. In such an instrument a ring with threaded bosses in place of pads or bosses with ground ends would normally be used. Also, since the ring would be elongated instead of compressed, either the direction of the scale on the micrometer thimble would be reversed or the direction of the thread on the thimble shank would be reversed.

It is to be understood that the embodiment of the present invention as shown and described is to be regarded as illustrative only and that the invention is susceptible to variations, modifications and changes within the scope of the appended claims.

I claim:

1. A proving ring comprising: a deformable ring having integral externally protruding load receiving bosses on a common transverse axis and two integral inwardly protruding lugs on the same common transverse axis, a micrometer thimble having a threaded shank and a graduated drum scribed to indicate the axial movement of said threaded shank; a ball-socket mount removably joined to one of said inwardly protruding lugs and having threaded engagement with the threaded shank of said thimble, said ball-socket mount being adjustable for leveling said thimble, an eye piece mounted adjacent to said thimble for reading said graduated drum, a height gauge assembly comprising a bracket removably joined to the other of said inwardly protruding lugs, a gauge with feeler pin, a stem supporting said gauge and means co-axial with said stem for adjusting the point contact between said feeler pin and said thimble, said stem and said co-axial adjusting means being in cooperation and having means to prevent rotation of said gauge.

2. A proving ring comprising: a deformable ring having integral externally protruding load receiving bosses on a common transverse axis and two integral inwardly protruding lugs on the same common transverse axis; a micrometer thimble having a threaded shank and a graduated drum scribed to indicate the axial movement of said threaded shank; a ball-socket mount removably joined to one of said inwardly protruding lugs and having threaded engagement with the threaded shank of said thimble, said ball-socket mount being adjustable for leveling said thimble, an eye piece mounted adjacent to said thimble for reading said graduated drum, a height gauge assembly comprising a bracket removably joined to the other of said inwardly protruding lugs, an electric height gauge with feeler pin, a stem supporting said electric height gauge and means co-axial with said stem for adjusting the point contact between said feeler pin and said thimble, said stem and said co-axial adjusting means being in cooperation and having means to prevent rotation of said electric height gauge; and a meter for indicating the output from said electric height gauge.

3. A proving ring comprising: a deformable ring having integral externally protruding load receiving bosses on a common transverse axis and two integral inwardly protruding lugs on the same common transverse axis; a micrometer thimble having on a common axis a threaded shank, a graduated drum and an anvil, said drum being scribed to indicate the axial movement of said threaded shank; a ball-socket mount removably joined to one of said inwardly protruding lugs and having threaded engagement with the threaded shank of said thimble, said ball-socket mount being adjustable for leveling said thimble for axial movement parallel with or on said transverse axis, an eye piece mounted adjacent to the graduated drum of said thimble, a magnifying lens with scribed index line within said eye piece, a height gauge assembly comprising a bracket removably joined to the other of said inwardly protruding lugs, an electric height gauge with feeler pin, a stem supporting said electric height gauge, means co-axial with said stem for adjusting the point contact between said feeler pin and the anvil on said thimble, means for locking said co-axial adjusting means, said stem and said co-axial adjusting means being in cooperation within a boss on said bracket and having means to prevent rotation of said electric height gauge; and a meter for indicating the output from said electric height gauge.

References Cited in the file of this patent

UNITED STATES PATENTS

| | | |
|---|---|---|
| 1,010,339 | Angel | Nov. 28, 1911 |
| 1,694,187 | Lewis | Dec. 4, 1928 |
| 1,927,478 | Whittemore et al. | Sept. 19, 1933 |
| 2,541,535 | Neff | Feb. 13, 1951 |

FOREIGN PATENTS

| | | |
|---|---|---|
| 770,663 | Great Britain | Mar. 20, 1957 |